United States Patent
Blankers et al.

(10) Patent No.: US 6,444,250 B1
(45) Date of Patent: *Sep. 3, 2002

(54) LIQUID, TRANSPARENT MIXTURE BASED ON LACTITOL

(76) Inventors: Izak Hendrik Blankers, #02-40 Goldhill Towers, 38 Goldhill Avenue, Singapore 309021 (SG); Inge Evers, Dr Dreeslaan 218, NL-4241 CM, Arkel (NL); Johannus Josephus Maria Putker, Schellinglaan 16, NL-2271 VE, Voorburg (NL); Bastiaan Terlouw, Kortgerecht 62, NL-4145 NM, Schoonrewoerd (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/355,460
(22) PCT Filed: Feb. 5, 1998
(86) PCT No.: PCT/NL98/00072
§ 371 (c)(1), (2), (4) Date: Nov. 27, 1999
(87) PCT Pub. No.: WO98/34500
PCT Pub. Date: Aug. 13, 1998

(30) Foreign Application Priority Data

Feb. 6, 1997 (NL) .............................................. 1005201

(51) Int. Cl.$^7$ .............................................. A23L 1/236
(52) U.S. Cl. ...................... 426/548; 426/658; 426/659; 426/660
(58) Field of Search ................................ 426/658, 548, 426/659, 660, 661

(56) References Cited

U.S. PATENT DOCUMENTS 5,527,554 A   6/1996   Olinger et al.

FOREIGN PATENT DOCUMENTS

| DE | 44 11 582 A | 10/1995 |
|----|-------------|---------|
| WO | 92/06943    | 4/1992  |
| WO | 95/26644    | 10/1995 |

OTHER PUBLICATIONS

Deis, R.C., AN 341313 Frosti, abstracting Cereal Foods World, 1994, 39(2), 93–97 (abstract only), 1994.*
Olinger et al., AN 410527 Frosti, abstracting Cereal Foods World, 1996, 41(3), 110–113+116–117 (abstract only), 1996.*

* cited by examiner

*Primary Examiner*—Leslie Wong
(74) *Attorney, Agent, or Firm*—Frishauf, Holtz, Goodman & Chick, P.C.

(57) ABSTRACT

Transparent, liquid mixture containing: (a) 60–80 per cent by weight (% by weight), preferably 65–75% by weight of dissolved solids containing, on the one hand, lactitol and, on the other hand, other polyols and/or hydrogenated polydextrose in a lactitol: other polyols and/or hydrogenated polydextrose weight ratio of from 40:60 to 80:20, and (b) 20–40% by weight, preferably 25–35% by weight, of water, at least 80% by weight of the other polyols and/or hydrogenated polydextrose being composed of hydrogenated saccharides made up of two or more dextrose units, said proportions being based on the total weight of other polyols. The mixture is preeminently suitable for use as a sweetener in foodstuffs, such as hard-boiled sweets, soft confectionery, ice-cream products, dessert products and bakery products.

20 Claims, No Drawings

LIQUID, TRANSPARENT MIXTURE BASED ON LACTITOL

This application is a U.S. National Phase application under 35 USC 371 of International Application PCT/NL98/00072 filed Feb. 5, 1998.

The invention relates to a liquid, transparent mixture which is based on lactitol and is very suitable for use as a sweetener and contains appreciably fewer calories than sugar.

Such a mixture is disclosed in WO 95/26644, which describes a syrup containing 1–56% by weight of lactitol, 30–95% by weight of a polydextrose, 0–10% by weight of liquid and 4–69% by weight of water, the polydextrose being a polymer obtained by polycondensation of glucose in the presence of sorbitol and citric acid and it being possible, according to Example 1, for the lactitol:polydextrose ratio to be 60:40. The use of polydextrose, however, has the disadvantage that it contains still residual sugars which may render a brown colour to the mixture and/or to the product prepared from this mixture.

Such liquid mixtures are also disclosed by John A. Van Velthuijsen in J. Agric., Food Chem., Vol. 27, No. 4, pages 680–686, where the preparation of a lactitol syrup by hydrogenating a lactose solution at elevated temperature and pressure in the presence of a Raney nickel catalyst is described. In this way, lactitol monohydrate and a lactitol syrup having a concentration of 64% are obtained after crystallization. If mixed with sorbitol, a lactitol syrup is obtained which has a concentration of 70%.

It has been found, however, that a lactitol syrup prepared in the way described above is unstable and cannot be stored for a fairly long time without crystallization of the dissolved lactitol occurring. Moreover, it has been found that the lactitol syrup prepared in the way described above contains too many impurities in the form of byproducts of the hydrogenation of lactose. In addition, it has been found that the lactitol/sorbitol syrups described are unsuitable for incorporation in, for example, hard-boiled sweets such as acid drops because, owing to the high hygroscopicity of the sorbitol, absorption of water occurs at the outside of the sweets, as a result of which they become sticky and more difficult to handle. Such hard-boiled sweets can therefore not be stored for a long time. Moreover, the sensory profile of sorbitol is not optimum: lactitol and maltitol, for example, have a more pleasant taste.

The object of the present invention is therefore to provide a stable syrup which has a high lactitol content and which can be stored for a fairly long time without crystallization of the lactitol occurring.

A syrup having a relatively high concentration of lactitol is also attractive from an economic point of view because of the greater volume of lactitol which can be transported in liquid form. In addition, a solution having a lower concentration of dissolved solids (lactitol) is also more rapidly liable to microbiological decay. The object of the invention is therefore also to provide a lactitol-containing syrup which is microbiologically stable. Moreover, the object of the invention is to provide a lactitol-containing syrup which has an excellent sensory profile and which is pre-eminently suitable for use as a sweetener in foodstuffs, especially in hard-boiled sweets, the quality and stability of the foodstuffs in terms of sweetness and resistance to moisture absorption being very good over a long time.

The above objects are: achieved by the present invention, which relates to a transparent, liquid mixture containing:

(a) 60–80 per cent by weight (% by weight), preferably 65–75% by weight of dissolved solids comprising, on the one hand, lactitol and, on the other hand, other polyols and/or hydrogenated polydextrose in a lactitol:other polyols and/or hydrogenated polydextrose weight ratio of from 40:60 to 80:20, and (b) 20–40% by weight, preferably 25–35% by weight, of water, at least 80% by weight of the other polyols and/or hydrogenated polydextrose being composed of hydrogenated saccharides made up of two or more dextrose units, said proportions being based on the total weight of other polyols.

Lactitol is a known sugar alcohol or polyol obtained by hydrogenation of the glucose part of the disaccharide lactose. For use in the mixture according to the invention both hydrated lactitol and anhydrous lactitol can be used. As regards the lactitol in hydrated form, the nonhygroscopic crystalline lactitol monohydrate is especially suitable. Said lactitol monohydrate is commercially obtainable in very pure form, for example under the brand name LACTY. However, lactitol dihydrate or lactitol anhydrate can be used.

Because the mixture according to the invention is a liquid, it is preferable to start from the lactitol reaction mixture obtained after the hydrogenation of lactose. Said reaction is usually performed in an aqueous medium in the presence of a suitable hydrogenation catalyst. The lactitol solution in water obtained after filtration, purification and possibly concentration by evaporation is very suitable as a source of lactitol for the preparation of the mixture according to the invention. The condition for using such a solution is, however, that the lactitol solution is sufficiently pure, that is to say at least 90% by weight, and preferably 95% by weight, of the content of dissolved solids is composed of lactitol. The advantage of using such a lactitol is that no crystallization step is necessary to obtain crystalline lactitol monohydrate or crystalline lactitol dihydrate which then has to be redissolved. The advantage of using a crystalline lactitol hydrate is the high purity (usually more than 97% by weight of lactitol).

At least 80% by weight, preferably 85% by weight, of the other polyols which may in addition to lactitol form component (a), based on the total weight of other polyols, are composed of hydrogenated saccharides which are made up of two or more dextrose units. In this connection, both a hydrogenated dextrose unit and an unhydrogenated dextrose unit count as a dextrose unit. Such hydrogenated saccharides therefore comprise maltitol (hydrogenated maltose, made up of 2 dextrose units), hydrogenated oligosaccharides composed of 3–6 dextrose units and hydrogenated polysaccharides which contain 7 or more dextrose units. Apart from that, the term "hydrogenated" as used in this connection relates especially to the terminal (reducible) dextrose unit of the relevant saccharide. The addition of hydrogen usually takes place at said terminal dextrose unit. Any proportion remaining up to 100% by weight of the other polyols which is not composed of hydrogenated saccharides made up of 2 or more dextrose units is primarily formed by hydrogenated monosaccharides, such as sorbitol and mannitol.

It has been found that it is particularly advantageous if the other polyols contain at least 5% by weight of maltitol, referred to the total weight of other polyols. Maltitol has in fact attractive sweetening properties and has a sweetening power which is greater than that of hydrogenated oligosaccharides and polysaccharides. On the other hand, maltitol is more hygroscopic than oligosaccharides and polysaccharides. Within the quantity of hydrogenated saccharides made up of 2 or more dextrose units, the weight ratio between maltitol, on the one hand, and the hydrogenated saccharides made up of 3 or more dextrose units (Dex3+) on the other hand, can vary within wide limits. The maltitol:Dex3+ weight ratio may appropriately vary from 1:20 to 15:1, preferably from 1:10 to 12:1. Examples of commercially obtainable saccharide mixtures or polyol mixtures which can be used as other polyols in addition to lactitol in component (a) of the mixture according to the invention are polyol mixtures which are sold under the brand names HYSTAR, for example HYSTAR 3375 and HYSTAR 6075, and MALTIDEX, such as MALTIDEX 080, MALTIDEX 085 and MALTIDEX 100.

Instead of or in addition to the hydrogenated oligosaccharides and polysaccharides described above or polyols, the mixture according to the invention may also contain polydextrose in hydrogenated form. Hydrogenated polydextrose is usually obtained by polymerization of dextrose with citric acid and/or sorbitol as possible comonomers, followed by hydrogenation, and is obtainable commercially. The advantage of hydrogenated polydextrose over unhydrogenated polydextrose is that the former no longer contains residual sugars, which may impart a brown colour to the mixture or to a product prepared from the mixture.

As stated, the weight ratio between lactitol, on the one hand, and the other polyols and/or hydrogenated polydextrose, on the other hand, should have a value of 40:60 to 80:20. With a weight ratio between these limits, the mixture according to the invention has a good stability. It has been found, however, that a weight ratio from 60:40 to 80:20, preferably from 68:32 to 76:24, results in an optimum stability of the mixture.

The mixture according to the invention can be manufactured by means of the known methods. Thus, the mixture according to the invention is manufactured by mixing a crystalline lactitol hydrate, for example the monohydrate, with the other polyols and/or hydrogenated polydextrose and water in quantities such that the lactitol:other polyols weight ratio has a value of from 40:60 to 80:20 and that the total quantity of dissolved solids varies from 60 to 80% by weight. A method which can advantageously be used proceeds from a lactitol solution which is obtained from the hydrogenation of lactose in an aqueous medium followed by filtration, purification and possibly concentration by evaporation. The other polyols are then added to said lactitol solution.

The mixture according to the invention is in principle a viscous, colourless, liquid solution or syrup which is very stable as such and can be stored a fairly long time. The mixture according to the invention is especially very suitable as sweetener in a number of foodstuffs, especially in hard-boiled sweets (hard sweets, acid drops, lollies and the like), soft confectionery (inter alia, liquorice and chewing gum), ice-cream products, dessert products and bakery products (biscuits, cake, pastry and the like). For incorporation in such foodstuffs, a sweetener in liquid form is to be preferred to a sweetener in solid form. As sweetener, lactitol has the advantage over sugar that it has a lower calorific value.

During incorporation in foodstuffs, and especially in hard-boiled sweets, the mixture according to the invention will usually be heated together with the other ingredients, as a result of which the water present in the mixture evaporates and the lactitol and the other polyols and/or the hydrogenated polydextrose will remain behind in the ratios specified above. The advantage of the chosen ratios between the various saccharide ingredients is that complete crystallization of the saccharide ingredients does not occur in the final product, which would result in white, dull blemishes and the product would therefore have an unattractive appearance. On the other hand, the chosen ratios result in the formation of only a few crystals or of a thin, transparent crystal layer, which give the final product both an attractive appearance and a good stability in the sense of resistance to moisture absorption. Moreover, the chosen ratio has the advantage that cold flow does not occur; the nondeformability is high and flow of the saccharide ingredients does not occur.

The invention finally also relates to foodstuffs which incorporate the mixture according to the invention.

The invention is illustrated further on the basis of the following examples.

EXAMPLE 1

Lactitol monohydrate (brand name LACTY) containing 5% by weight of water was mixed with MALTIDEX 100 (dry matter content 74.2% by weight, of which 72% by weight is maltitol, approximately 25% by weight hydrogenated oligodextroses and hydrogenated polydextroses and 2.5% by weight sorbitol) and water in a quantity such that mixtures were obtained having a dissolved solids content of 65 and 70% by weight, in which the lactitol:other polyols ratio was 70:30 and 60:40. The mixtures thus obtained were clear, viscous liquids.

The quantities of the various components for the various mixtures are specified in Table I.

TABLE I

| | Mixtures A–D | | | |
|---|---|---|---|---|
| Mixture | A | B | C | D |
| Dissolved solids | 65% by wt | 65% by wt | 70% by wt | 70% by wt |
| Lactitol: other polyols | 60:40 | 70:30 | 60:40 | 70:30 |
| Lactitol solution (quantity of lactitol) | 157.9 g (150 g) | 184.2 g (175 g) | 157.9 g (150 g) | 184.2 g (175 g) |
| MALTIDEX 100 (quantity of other polyols) | 134.8 g (100 g) | 101.1 g (75 g) | 134.8 g (100 g) | 101.0 g (75 g) |
| Water | 91.9 g | 99.3 g | 64.4 g | 71.8 g |

The mixtures A, B, C and D were then tested for their stability. For this purpose, the samples of the mixtures were kept for 8 weeks at temperatures of 4° C., 20° C. and 50° C. in order to examine the crystallization behaviour.

After 8 weeks, all the samples were still clear and free of crystals at all of the three temperatures. It can therefore be concluded from this that the liquid mixture according to the invention is very stable in all cases, i.e. no crystallization of lactitol and other polyols takes place, between 4 and 50° C. Storage of the mixture will usually take place within said temperature range and, in addition, storage and use of the final products incorporating the mixture will take place within said temperature range.

EXAMPLE 2

Lactitol monohydrate (brand name LACTY) containing 5% by weight of water was mixed with HYSTAR 6075 (dry matter content 75% by weight, of which 8% by weight is maltitol, 78% by weight hydrogenated oligodextroses and hydrogenated polydextroses and 14% by weight sorbitol) and water in quantities such that two mixtures were obtained having a dissolved solids content of 70% by weight: one in which the lactitol:other polyols ratio was 70:30 (mixture E) and one in which said ratio was 60:40 (mixture F). Both mixtures were clear, viscous liquids.

The mixtures E and F were then processed to produce hard-boiled sweets. For this purpose, each mixture was heated to 170° C., then cooled to 120° C. and introduced into glass moulds. The absorption of water (hygroscopicity) was then measured by keeping the mixtures thus obtained in glass moulds at 20° C. and an atmospheric humidity of 60% or 70% ("60% RH, 20° C." and "70% RH, 20° C.", respectively). The increase in weight of the samples was regularly measured for 14 days. The relative moisture absorption (RMA) is expressed in % by weight of moisture absorption as a measure of the hygroscopicity. The samples were also assessed visually by examining whether a stable, clear crystal layer was formed or whether complete crystallization of the lactitol possibly took place, which would produce dull blemishes. Whether there was cold flow was also examined. The results are given in Table II.

TABLE II

Relative moisture absorption (in %) and appearance

|  | Mixture E | | Mixture F | |
| --- | --- | --- | --- | --- |
|  | RMA 60% RH 20° C. | RMA 70% RH 20° C. | RMA 60% RH 20° C. | RMA 70% RH 20° C. |
| 2 days | 0.38 | 0.94* | 0.38 | 0.96* |
| 4 days | 0.53 | 1.15** | 0.54(*) | 1.13** |
| 7 days | 0.71* | 1.36** | 0.67* | 1.22** |
| 11 days | 0.84* | 1.61** | 0.71* | 1.36** |
| 14 days | 0.88* | 1.79** | 0.73*(*) | 1.46** |

(*): transition state
*: some small crystals
**: thin, transparent crystal layer
***: complete crystallization
-: cold flow occurs From the table it is evident that both mixtures exhibit no cold flow in hard-boiled sweets and, in addition, do not result in the undesirable complete crystallization, but at most produce a thin, transparent crystal layer on the sweets. Moreover, it is evident from Table II that the relative moisture absorption of the sweets containing the mixtures according to the invention is very low, which indicates a good stability of the sweets as a result of which they do not become sticky on storage for a certain time.

EXAMPLE 3

Lactitol monohydrate (brand name LACTY) containing 5% by weight of water was mixed with hydrogenated polydextrose and water in a quantities such that mixture were obtained having a dissolved solids content of 70% by weight, the lactitol:hydrogenated polydextrose weight ratio being 70:30 (mixture G). The mixture was a clear, viscous liquid.

Mixture G was then processed in the same way as described in Example 2 to produce hard-boiled sweets. The RMA was determined by measuring the increase in weight of the sample at a relative humidity of 60% and a temperature of 20° C. (60% RH, 20° C.) and at a relative humidity of 70% and a temperature of 30° C. (70% RH, 30° C.) regularly for 11 days. Whether there was cold flow was also examined. The results are given in Table III.

EXAMPLE 4

The procedure of Example 3 was repeated on the understanding that, instead of hydrogenated polydextrose, MALTIDEX 85 (dry matter content 69.5% by weight, of which 87% by weight is maltitol, approximately 8.5% by weight hydrogenated oligodextroses and polydextroses and 4% by weight sorbitol) was now used. The mixture obtained (mixture H) therefore had a dissolved solids content of 70% by weight and contained lactitol and other polyols in a weight ratio of 70:30. The mixture was a clear, viscous liquid.

Mixture H was then processed in the same way as described in Example 2 to produce hard-boiled sweets. The RMA was determined by measuring the increase in weight of the sample regularly for 11 days. Whether there was cold flow was also examined. The results are given in Table III.

Comparative Example 1

The procedure of Example 3 was repeated, with the understanding that, instead of hydrogenated polydextrose, sorbitol was now used. The mixture obtained (mixture K) therefore had a dissolved solids content of 70% by weight and contained lactitol and sorbitol in a weight ratio of 70:30.

Mixture K was then processed in the same way as described in Example 2 to produce hard-boiled sweets. The RMA was determined by measuring the increase in weight of the sample regularly for 11 days. Whether there was cold flow was also examined. The results are given in Table III.

From Table III, it is evident that the mixtures according to the invention (G and H) do not exhibit cold flow in hard-boiled sweets under normal conditions of 60% relative humidity and 20° C. and, in addition, do not result in the undesirable complete crystallization, but at most produce a thin, transparent crystal layer on the sweets. The relative moisture absorption of the sweets which contain the mixtures according to the invention is also relatively low, which indicates a good stability of the sweets. As has been stated, this indicates that the sweets do not become sticky even when stored for a certain time. It is only at a relative atmospheric humidity of 70% and a temperature of 30° C. that some cold flow occurs.

Moreover, it is evident from Table III that the mixture K, which is not according to the invention, has a higher relative moisture absorption than the two mixtures G and H under the same conditions (and will therefore become sticky on storage). but in addition, exhibit a much more serious degree of cold flow. Cold flow already occurs even under the mild conditions of 60% relative atmospheric humidity and 20° C. The stability of such sweets leaves something to be desired and is in any case poorer than the stability of sweets based on the mixtures according to the invention.

TABLE III

Relative moisture absorption (in %) and appearance

|  | Mixture G | | Mixture H | | Mixture K | |
| --- | --- | --- | --- | --- | --- | --- |
|  | RMA 60% RH 20° C. | RMA 70% RH 30° C. | RMA 60% RH 20° C. | RMA 70% RH 30° C. | RMA 60% RH 20° C. | RMA 70% RH 30° C. |
| 1 day | 0.21 | 2.80*- | 0.23 | 2.60* | 0.33- | 2.89*- - |
| 4 days | 0.62* | 8.79**- | 0.59* | 7.17** | 0.93*-- | 11.70**-- |
| 6 days | 0.81* | 9.67**- | 0.72* | 8.66** | 1.16*-- | 14.13**-- |

TABLE III-continued

Relative moisture absorption (in %) and appearance

| | Mixture G | | Mixture H | | Mixture K | |
|---|---|---|---|---|---|---|
| | RMA 60% RH 20° C. | RMA 70% RH 30° C. | RMA 60% RH 20° C. | RMA 70% RH 30° C. | RMA 60% RH 20° C. | RMA 70% RH 30° C. |
| 8 days | 0.96* | 10.63**-- | 0.82* | 9.84**- | 1.37*-- | 16.59**-- |
| 11 days | 1.07* | 12.35**-- | 0.91* | 12.13**- | 1.60*-- | 20.30**--- |

(*)transition state
*some small crystals
**thin, transparent crystal layer
***complete crystallization
-a slight degree of cold flow occurs
- -cold flow occurs
- - -serious cold flow occurs

We claim:
1. A transparent, liquid mixture consisting essentially of:
   (a) 60–80 per cent by weight of dissolved solids consisting essentially of lactitol and other polyols in a lactitol:other polyols weight ratio of from 40:60 to 80:20, and
   (b) 20–40% by weight of water,
   at least 80 by weight of the other polyols consisting essentially of hydrogenated saccharides made up of two or more dextrose units, said proportions being based on the total weight of the other polyols,
   the mixture excluding unhydrogenated polydextrose.
2. The mixture according to claim 1, wherein the quantity of dissolved solids is 65–75% by weight and the quantity of water is 25–35% by weight.
3. The mixture according to claim 1, wherein the lactitol:other polyols weight ratio has a value of from 60:40 to 80:20.
4. The mixture according to claim 2, wherein the lactitol:other polyols weight ratio has a value of from 60:40 to 80:20.
5. The mixture according to claim 1, wherein at least 85% of the other polyols, based on the total weight of the other polyols, consist essentially of hydrogenated saccharides which are made up of two or more dextrose units.
6. The mixture according to claim 2, wherein at least 85% of the other polyols, based on the total weight of the other polyols, consist essentially of hydrogenated saccharides which are made up of two or more dextrose units.
7. The mixture according to claim 3, wherein at least 85% of the other polyols, based on the total weight of the other polyols, consist essentially of hydrogenated saccharides which are made up of two or more dextrose units.
8. The mixture according to claim 4, wherein at least 85% of the other polyols, based on the total weight of the other polyols, consist essentially of hydrogenated saccharides which are made up of two or more dextrose units.
9. The mixture according to claim 1, wherein the weight ratio of maltitol:hydrogenated saccharides made up of 3 or more dextrose units in the other polyols has a value of from 1:20 to 15:1.
10. The mixture according to claim 2, wherein the weight ratio of maltitol:hydrogenated saccharides made up of 3 or more dextrose units in the other polyols has a value of from 1:20 to 15:1.
11. The mixture according to claim 3, wherein the weight ratio of maltitol:hydrogenated saccharides made up of 3 or more dextrose units in the other polyols has a value of from 1:20 to 15:1.
12. The mixture according to claim 4, wherein the weight ratio of maltitol:hydrogenated saccharides made up of 3 or more dextrose units in theother polyols has a value of from 1:20 to 15:1.
13. The mixture according to claim 6, wherein the weight ratio of maltitol:hydrogenated saccharides made up of 3 or more dextrose units in the other polyols has a value of from 1:20 to 15:1.
14. The mixture according to claim 6, wherein the weight ratio of maltitol:hydrogenated saccharides made up of 3 or more dextrose units in the other polyols has a value of from 1:20 to 15:1.
15. The mixture according to claim 7, wherein the weight ratio of maltitol:hydrogenated saccharides made up of 3 or more dextrose units in the other polyols has a value of from 1:20 to 15:1.
16. The mixture according to claim 8, wherein the weight ratio of maltitol:hydrogenated saccharides made up of 3 or more dextrose units in the other polyols has a value of from 1:20 to 15:1.
17. A method of preparing a mixture according to claim 1, comprising adding the other polyols to a lactitol solution which is obtained from a hydrogenation of lactose in an aqueous medium followed by filtration and purification, the other polyols being added in a quantity such that the lactitol:other polyols weight ratio is 40:60 to 80:20 and the total quantity of dissolved solids is 60 to 80 percent by weight.
18. A method of sweetening a foodstuff comprising incorporating the mixture according to claim 1 in a foodstuff.
19. The method according to claim 18, wherein said foodstuff is selected from the group consisting of hard-boiled sweets, soft confectionery, ice-cream products, dessert products and bakery products.
20. A sweetened foodstuff comprising a mixture according to claim 1.

* * * * *